US011900494B2

(12) United States Patent
De Cremer et al.

(10) Patent No.: US 11,900,494 B2
(45) Date of Patent: *Feb. 13, 2024

(54) METHOD AND APPARATUS FOR ADAPTIVE SECURITY GUIDANCE

(71) Applicant: SECURE CODE WARRIOR LIMITED, Northampton (GB)

(72) Inventors: Pieter De Cremer, Oostkamp (BE); Matias Madou, Lichtervelde (BE); Nathan Desmet, Beernem (BE); Colin Wong, Sydney (AU)

(73) Assignee: SECURE CODE WARRIOR LIMITED, Northampton (GB)

( * ) Notice: Subject to any disclaimer, the term of this patent is extended or adjusted under 35 U.S.C. 154(b) by 11 days.

This patent is subject to a terminal disclaimer.

(21) Appl. No.: 17/469,636

(22) Filed: Sep. 8, 2021

(65) Prior Publication Data

US 2021/0407027 A1 Dec. 30, 2021

Related U.S. Application Data

(63) Continuation of application No. 16/234,037, filed on Dec. 27, 2018, now Pat. No. 11,145,019.

(51) Int. Cl.
*G06Q 50/20* (2012.01)
*G06Q 10/0639* (2023.01)
(Continued)

(52) U.S. Cl.
CPC ..... *G06Q 50/2057* (2013.01); *G06F 16/9035* (2019.01); *G06Q 10/06398* (2013.01); *G06F 21/577* (2013.01); *G06F 2221/033* (2013.01)

(58) Field of Classification Search
CPC .......... G06Q 50/2057; G06Q 10/06398; G06F 16/9035; G06F 21/577
See application file for complete search history.

(56) References Cited

U.S. PATENT DOCUMENTS

| 8,701,084 B1 | 4/2014 | MacDonald |
| 9,081,595 B1 | 7/2015 | Delarue et al. |

(Continued)

OTHER PUBLICATIONS

Christopher Douce et al., "Automatic test-based assessment of programming: A review," 2005 [retrieved on Sep. 27, 2023], Journal on Educational Resources in Computing, vol. 5, Issue 3, pp. 1-13, downloaded from <url>:https://dl.acm.org. (Year: 2005).*

(Continued)

*Primary Examiner* — S. Sough
*Assistant Examiner* — Stephen D Berman
(74) *Attorney, Agent, or Firm* — Hauptman Ham, LLP

(57) ABSTRACT

A method includes processing computer readable code as the computer readable code is being written in a development environment to identify at least one error in the computer readable code. The method also includes searching a database for user profile information indicative of a training sequence performed by a user and a competence level assigned to the user. The competence level is based on a quantity of tasks included in the training sequence performed by the user free from error. The method also includes causing a graphical user interface to be displayed. The graphical user interface includes a concurrent display of the computer readable code having the at least one error, a preview of the computer readable code free from having the at least one error, and a remediation suggestion to correct the at least one error in the computer readable code based on the competence level.

14 Claims, 13 Drawing Sheets

(51) Int. Cl.
G06F 16/9035 (2019.01)
G06F 21/57 (2013.01)

(56) References Cited

U.S. PATENT DOCUMENTS

| | | | |
|---|---|---|---|
| 9,305,279 B1 | 4/2016 | Menzel | |
| 9,544,327 B1 | 1/2017 | Sharma et al. | |
| 9,785,432 B1* | 10/2017 | Wright | G06F 8/77 |
| 11,093,875 B2* | 8/2021 | Hancock | G06Q 50/2057 |
| 2004/0117761 A1 | 6/2004 | Andrews et al. | |
| 2009/0182757 A1* | 7/2009 | Lotlikar | G06Q 30/02 |
| | | | 707/999.102 |
| 2010/0251027 A1 | 9/2010 | Yawalkar et al. | |
| 2016/0188301 A1 | 6/2016 | Zang et al. | |
| 2017/0076244 A1 | 3/2017 | Bastide et al. | |
| 2017/0123790 A1* | 5/2017 | Gupta | G06F 11/3604 |
| 2018/0357588 A1* | 12/2018 | J D | G06F 8/71 |
| 2019/0012250 A1 | 1/2019 | Kamath | |
| 2019/0026702 A1* | 1/2019 | Hodge | H04L 12/1822 |
| 2019/0164449 A1 | 5/2019 | Kems et al. | |
| 2019/0205542 A1 | 7/2019 | Kao et al. | |
| 2019/0227793 A1* | 7/2019 | Ramasamy | G06F 11/3688 |
| 2019/0339964 A1 | 11/2019 | Young et al. | |
| 2021/0182055 A1* | 6/2021 | Gross | G06F 8/24 |

OTHER PUBLICATIONS

Kivanc Muslu et al., "Speculative analysis of integrated development environment recommendations," 2012 [retrieved on Mar. 12, 2021], ACM Sigplan Notices, vol. 47, Issue 10, pp. 669-682, downloaded from <url>:https://dl.acm.org/. (Year: 2012).

* cited by examiner

```
stmt.execute( SQL "SELECT REFERENCE, CONTENT, UPLOADDATE, TOTALAMOUNT FROM SLIPS " +
              "WHERE REFERENCE='" + reference + "' LIMIT 1");

Payment p = Could lead to SQL injection more... (⌘F1)
ResultSet result = stmt.getResultSet();
```

| Sensei usage statistics | | | |
|---|---|---|---|
| Metric | Error | Warning | Info |
| QuickFixed | 5 | 0 | 0 |
| Prevented | 5 | 0 | 0 |
| Removed | 5 | 0 | 0 |
| Compliant | 5 | 0 | 0 |
| Metric | Value | | |
| Chunks used | 2 | | |
| Descriptions opened | 2 | | |
| Violations shown | 5 | | |

```
public static Payment[] getPaymentListFiltered(double minamount) throws SQLException {
  try (Statement stmt = c.createStatement()) {
    stmt.execute( sql  "SELECT REFERENCE, UPLOADDATE, TOTALAMOUNT FROM SLIPS " +
                "WHERE TOTALAM
    return getPaymentArray(
  }
}
```

▶ Introduce local variable
▶ Copy String concatenation text to the clipboard

1000

METHOD AND APPARATUS FOR ADAPTIVE SECURITY GUIDANCE

PRIORITY

The present application is a continuation of U.S. patent application Ser. No. 16/234,037, filed on Dec. 27, 2018, the entirety of which is incorporated herein by reference.

BACKGROUND

Software developers are continually challenged to produce computer readable code with limited errors. Errors in computer readable code often lead to programs that have potential security flaws. Training is sometimes performed by software developers to improve a developer's skills for preventing the introduction of errors into the computer readable code. Such training is sometimes superfluous and is often directed to skills that the developer may already have.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 6A is a diagram of a user interface, in accordance with one or more embodiments.

FIG. 6B is a diagram of a user interface, in accordance with one or more embodiments.

FIG. 7 is a diagram of a user interface, in accordance with one or more embodiments.

FIG. 10 is a diagram of a user interface, in accordance with one or more embodiments.

DETAILED DESCRIPTION

Figure 1:
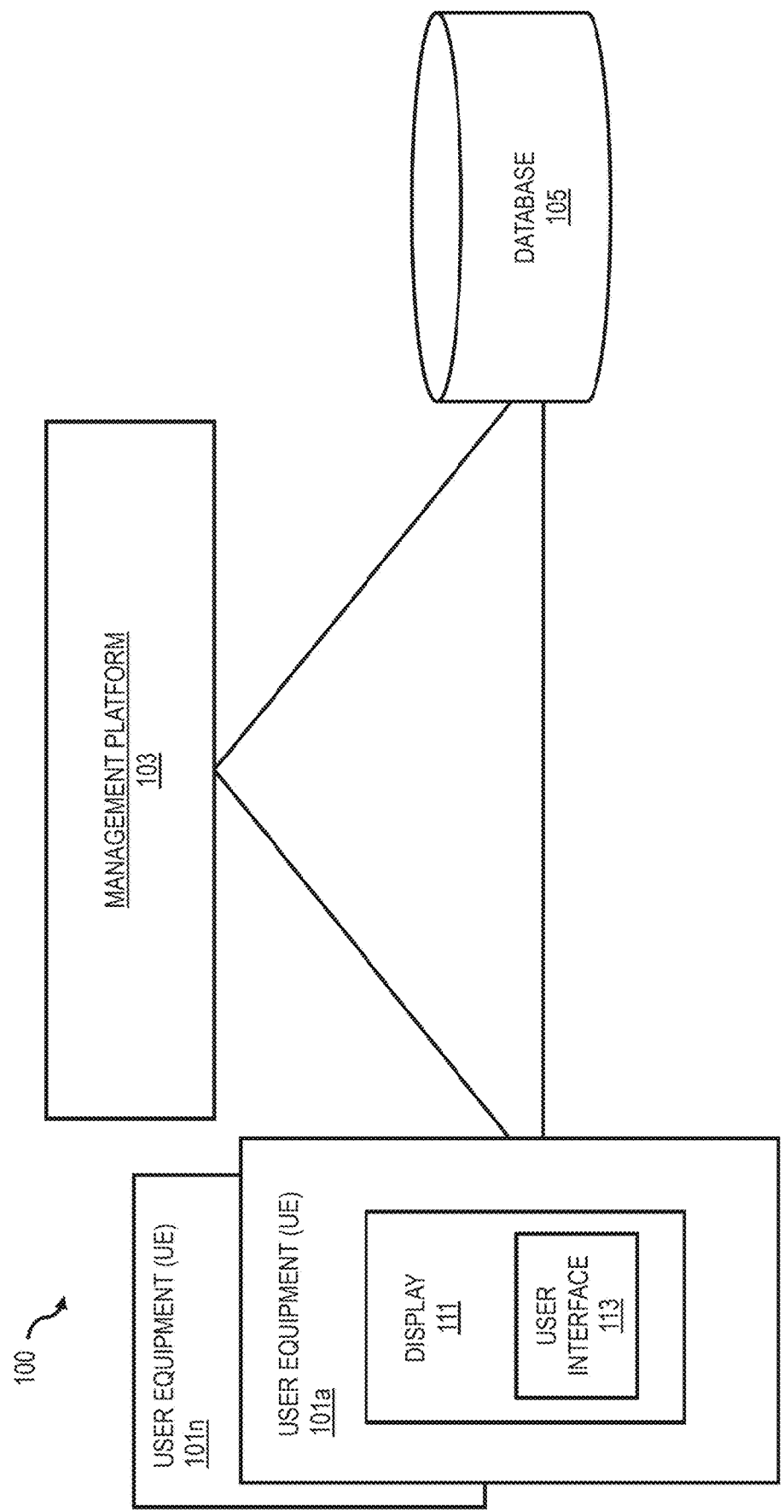
FIG. 1 is a diagram of system for providing adaptive security guidance, in accordance with one or more embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation or position of a first feature over or on a second feature in the description that follows may include embodiments in which the first and second features are formed or positioned in direct contact, and may also include embodiments in which additional features may be formed or positioned between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of an apparatus or object in use or operation in addition to the orientation depicted in the figures. The apparatus may be otherwise oriented (rotated 90 degrees or at other orientations) and the spatially relative descriptors used herein may likewise be interpreted accordingly.

Software developers often undergo code writing and security training. Such training, however, is sometimes generic and irrelevant to a software developer's daily practices. Companies, managers, instructors and developers often desire statistical data indicative of one or more developers' knowledge, competence, and/or practice capabilities.

FIG. 1 is a diagram of system 100, in accordance with one or more embodiments. In some embodiments, the system 100 makes it possible to provide highly customized training to software developers and help software developers obtain code writing and software security skills that are relevant to the software developer's work, day-to-day tasks, or goals. Providing customized training helps to avoid lost time and resources that are sometimes wasted by performing superfluous training, which may hinder a developer's production efficiency and efficacy.

System 100 is configured to observe the secure code writing skills of one or more developers working on a project, analyze any skills deficits that may result in an insecure software product, and remedy the shortcomings in a time-efficient manner.

In some embodiments, system 100 is configured to measure the competence of developers having a user profile associated with system 100. For example, system 100 makes it possible to measure the competence of one or more developers within a company that implements system 100 or associated with a given project and identify requirements for a developer's secure code writing skills at different levels of granularity.

In some embodiments, system 100 is configured to measure a developer's competence on one or more of a system-wide level, a company-wide level, wherein the company implements the system 100 across numerous sectors and/or projects, a project level, a team level, an individual developer level, or some other suitable grouping of developers associated with the system 100, a company, a project or a team, by which a high-level view of competency may be helpful for discerning whether additional training may be helpful for completing a project with as few errors or potential security flaws as possible.

In an embodiment where system 100 is used by a company in the financial sector, developers in this sector are often tasked with developing computer readable code for handling and storing sensitive data. Developers that are responsible for developing computer readable code are often under pressure to have sufficient security skills to do this. System 100 makes it possible to obtain a high-level review of the general security competence level of the developers at the company.

For example, if a review of the competence level at a company is indicative that about 75% of the developers have sufficient skills to handle sensitive data, a decision at the company may be made to invest in more training for handling sensitive data.

In some embodiments, system 100 makes it possible to obtain a project-level review of one or more developers that work on a specific application. If, for example, one or more developers at a company that implements system 100 are assigned to develop a mobile application and a web application, the one or more developers of the mobile application should have knowledge regarding mobile security, while the one or more developers of the web application may need to have knowledge regarding web application security, web security, or some other type of security. In some embodiments, system 100 is configured to generate and display information indicative of the skillsets that the one or more developers on a given project have or may need to effectively complete the project.

In some embodiments, system 100 makes it possible to obtain a team-level review of a group or a team of developers that work on a specific application, a specific part of an application, or a specific type of an application. For example, if developers working on a frontend of an application should have knowledge about errors or vulnerabilities that often occur in the frontend (such as cross-site scripting), while developers that work on a backend of an application should have knowledge about errors or vulnerabilities that often occur on the backend. In some embodiments, system 100 is configured to generate and display information indicative of the skillsets that the one or more developers on a given project have or may need to effectively complete tasks associated with the front end or the backend of an application.

In some embodiments, system 100 makes it possible to obtain a review of an individual developer that works on a specific application. For example, if a developer A works on database queries a lot of the time and a developer B works on Extensible Markup Language ("XML") parsers a lot of the time, developer A should have knowledge of SQL injection, while developer B should have knowledge of XML External Entity ("XXE") and XML injection. In some embodiments, system 100 is configured to generate and display information indicative of the skillsets developer A and/or developer B have or may need to effectively complete tasks associated with each of developer A's and developer B's particular roles within the company or with respect to a specific application.

As shown in FIG. 1, the system 100 comprises user equipment (UE) 101a-101n (collectively referred to herein as "UE 101") having connectivity to a management platform 103 and a database 105.

The UE 101, the management platform 103 and the database 105 are modular components of a special purpose computer system. In some embodiments, one or more of the UE 101, the management platform 103, and the database 105 are unitarily embodied in the UE 101. The UE 101, accordingly, comprises a processor by which the management platform 103 is executed. In some embodiments, one or more of the UE 101, the management platform 103 and/or the database 105 are configured to be located remotely from each other. By way of example, the UE 101, the management platform 103 and/or the database 105 communicate by wired or wireless communication connection and/or one or more networks, or combination thereof.

The UE 101 is a type of mobile terminal, fixed terminal, or portable terminal including a desktop computer, laptop computer, notebook computer, netbook computer, tablet computer, wearable circuitry, mobile handset, server, gaming console, or combination thereof. The UE 101 comprises a display 111 by which a user interface 113 is displayed. In some embodiments, the user interface 113 additionally or alternatively comprises an audio interface or an interface that interacts with a user via a haptic response.

Management platform 103 is a set of computer readable instructions that, when executed by a processor such as a processor 1103 (FIG. 11), facilitates the connectivity between the UE 101 and database 105. In some embodiments, the management platform 103 causes information that describes one or more of the UE 101, interactions with user interface 113, or other suitable information to be stored in the database 105. In some embodiments, management platform 103 is implemented by a computer remote from UE 101. In some embodiments, management platform 103 is implemented by one or more UE 101's. In some embodiments, a portion of management platform 103 is implemented by at least one UE 101 and by one or more other UE 101's and/or one or more other computers remote from UE 101.

In some embodiments, the management platform 103 is additionally configured to cause an operating or behavioral status or function of one or more of the UE 101 to be queried and optionally stored in the database 105.

In some embodiments, one or more of the management platform 103 or the UE 101 is configured to query, or issue commands to determine the operating or behavioral status, a configuration, or function via one or more application programming interfaces (API's). Similarly, in some embodiments, one or more of the management platform 103 or the UE 101 is configured to change the operating or behavioral status, a configuration, or function via one or more API's.

Database 105 is a memory such as a memory 1105 (FIG. 11) capable of being queried or caused to store data associated with the UE 101 and/or a user interaction with the user interface 113.

Management platform 103 is configured to process computer readable code to identify one or more errors in the computer readable code. In some embodiments, the computer readable code is generated in a development environment that is one or more of included as a part of system 100 or with which the system 100 is in communication. In some embodiments, developers that use the development environment for generating computer readable code have a user profile associated with the development environment. In some embodiments, the user profile is stored in database 105. In some embodiments, the user profile includes information regarding one or more training sequences completed by the developer. In some embodiments, the information regarding the one or more training sequences comprises one or more of a topic of the training sequence, a difficulty level of the training sequence, a content of the training sequence, a success rate of the training sequence, a time the training sequence was performed, a duration of time taken to complete the training sequence, a quantity of errors that occurred while performing a training sequence, a quantity of compliances that occurred while performing the training sequence, or some other suitable information indicative of a developer's level of performance while attempting to complete the training sequence. In some embodiments, management platform 103 is configured to identify a user profile associated with the development environment used to generate the computer readable code and search a database for user profile information indicative of a training sequence performed by a user associated with the user profile.

In some embodiments, the one or more errors identified in the computer readable code are of various types. For example, one type of error may be associated with XML injection, whereas another type of error may be associated with SQL injection. In some embodiments, a type of error may be specifically associated with a programming language used to write the computer readable code, or some other suitable identifiable type of error. For example, an error specific to Java may not occur or be associated with computer readable code written using C++ or some other programming language, and vice versa. The management platform 103 is configured to identify a type of at least one of the one or more errors identified in the computer readable code and compare the type of the at least one of the one or more errors identified in the computer readable code with one or more properties associated with the training sequence. In some embodiments, a property associated with the training sequence corresponds to the information indicative of a training sequence stored in database 105 that is associated with the user profile of a developer having a user profile associated with system 100.

In some embodiments, management platform 103 is configured to calculate a severity of at least one identified error based on the comparison with the one or more properties associated with the training sequence and assign a competence level to the user associated with the user profile based on the calculated severity. Based on the competence level, the management platform 103 generates a remediation suggestion to correct at least one of the one or more errors in the computer readable code based on the competence level.

In some embodiments, management platform 103 causes the computer readable code to be output by display 111 and causes at least one error of the one or more errors identified in the computer readable code to be displayed differently as compared to a portion of the computer readable code that is free from having the identified one or more errors. For example, the different displaying of the at least one error makes it possible for a user that is writing the computer readable code to readily identify the error. In some embodiments, the computer readable code comprises one or more textual characters and at least one identified error is caused to be displayed differently by one or more differentiation modes. The one or more differentiation modes comprises one or more of highlighting the at least one error, underlining the at least one error, changing a font of the error, changing a font size of the at least one error, displaying the error in a bold font, displaying error in an italicized font, or displaying the at least one error using a different color text compared to the portion of the computer readable code that is free from having the one or more errors. In some embodiments, underlining the error comprises one or more of displaying a straight line below the at least one error, displaying a squiggly line below the at least one error, or displaying some other suitable marking above, below or encompassing the at least one error.

In some embodiments, the type of the at least one error is one of a plurality of different error types, and the one or more differentiation modes used to display the at least one error is based on the identified type of the at least one error. For example, if a first type of error is identified in the computer readable code, the first type is optionally differentiated by way of highlighting, but if a second type of error different from the first type of error is identified in the computer readable code, the second type is optionally differentiated by underlining.

In some embodiments, management platform 103 is configured to calculate a total quantity of the one or more errors in the computer readable code, and assign the competence level to the user associated with the user profile is based, at least in part, on the total quantity of the one or more errors in the computer readable code.

In some embodiments, management platform 103 causes one or more of the total quantity of the one or more errors to be stored in database 105, or the type of each error of the quantity of the one or more errors to be stored in database 105 and assign the competence level to the user associated with the user profile is based, at least in part, on one or more of the total quantity of the one or more errors in the computer readable code stored in database 105 or the type of each error stored in database 105.

In some embodiments, management platform 103 is configured to identify a quantity of tasks included in a training sequence performed by the user associated with the user profile, identify a quantity of the tasks completed free from error, compare a quantity of the one or more errors with the quantity of tasks completed free from error, and generate one or more hints to complete one of more of the tasks included in the training sequence free from error. In some embodiments, management platform 103 is configured to assign the competence level to the user associated with the user profile based, at least in part, on the comparison of the quantity of the one or more errors with the quantity of tasks completed free from error and a quantity of hints applied by the user associated with the user profile to complete the one of more tasks included in the training sequence free from error.

Figure 2:
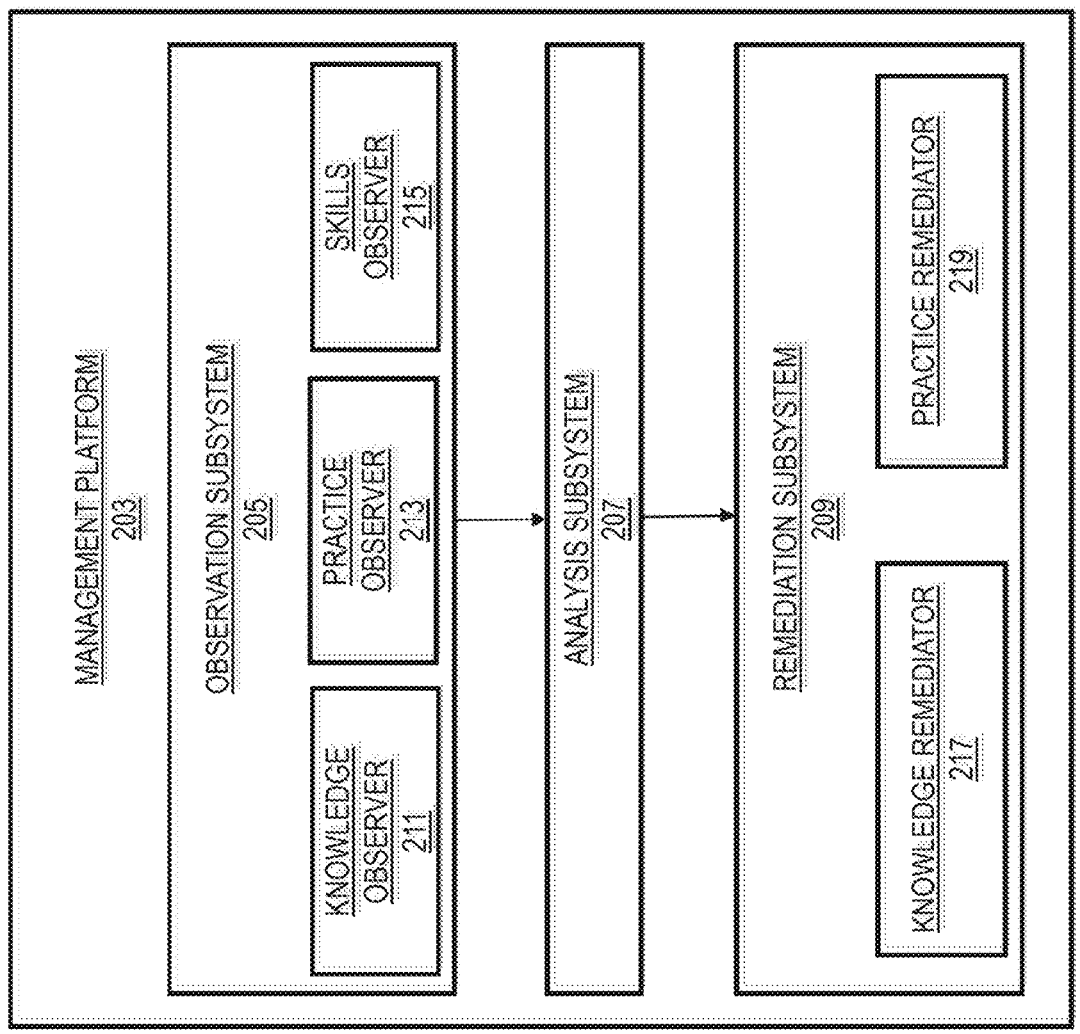
FIG. 2 is a diagram of a management platform, in accordance with one or more embodiments.

FIG. 2 is a diagram of a management platform 203, in accordance with one or more embodiments. In some embodiments, management platform 203 is usable as management platform 103 (FIG. 1).

Management platform 203 comprises observation subsystem 205, analysis subsystem 207 and remediation subsystem 209. In some embodiments, one or more of observation subsystem 205, analysis subsystem 207 or remediation subsystem 209 is at least partially implemented by UE 101 (FIG. 1). In some embodiments, one or more of observation subsystem 205, analysis subsystem 207 or remediation subsystem 209 is at least partially implemented by one or more of a computer remote from UE 101 or another UE 101. In some embodiments, management platform 203 is entirely implemented by a processor remote from UE 101. In some embodiments, management platform 203 is entirely implemented by UE 101.

Observation subsystem 205 is configured to synthesize gathered data for one or more developers into three data sets for each developer. In some embodiments, the gathered data for the one or more developers comprises information indicative of a developer's knowledge, information indicative of a developer's performance in practice, and information indicative of a skillset the developer should have for performing the developer's day-to-day tasks at a company that implements system 100 (FIG. 1), for example, with respect to a given project, or a developer's goals for improving a developer's skillset.

Analysis subsystem 207 is configured to identify one or more deficits in the skillset the developer should have to perform the developer's day-to-day tasks, or with respect to a developer's goals. In some embodiments, analysis subsystem 207 is configured to analyze a developer's progress toward achieve the skillset the developer should have over time.

Remediation subsystem 209 is configured to provide guidance to a developer to improve the developer's skillset for performing his day-to-day tasks.

Observation subsystem 205 comprises knowledge observer module 211, practice observer module 213 and skills observer module 215.

In some embodiments, observation subsystem 205 is configured to implement a training platform as the knowledge observer module 211 and the skills observer module 215. In some embodiments, the training platform is a software-as-a-service (SaaS) training platform. In some embodiments, observation subsystem 205 observes and measures the knowledge of a developer by measuring the developer's competence during training.

In the training platform, developers follow hands-on training modules for a wide range of software vulnerabilities. In some embodiments, management platform 203 is configured to impose one or more training modules on a developer at predefined time intervals for a developer to complete. In some embodiments, the management platform 203 is configured to set the predefined time intervals based on a user input. For example, management platform 203 makes it possible for a company that implements system 100 to have developers to complete assessments on a regular basis.

Management platform 203 is configured to generate a knowledge profile for a developer that has a user profile associated with system 100 based, at least in part, on training data and assessment data gathered for the developer. Different vulnerabilities are organized into several categories and, for each category, a number of completed training modules as well as the developer's accuracy while attempting to complete a training module is taken into consideration to calculate the security skills of a developer associated with the user profile.

In some embodiments, observation subsystem 205 is configured to implement an integrated development environment (IDE) plug-in as the knowledge observer module 211 and the skills observer module 215. In some embodiments, the plugin is installed on UE 101 for access to the IDE. In some embodiments, the development environment is remotely accessible by way of management platform 203.

In some embodiments, the observation subsystem 205 is configured to differentiate computer readable code that has errors compared to computer readable code that is free from having errors in real-time while a developer is writing the computer readable code. In some embodiments, the observation subsystem 205 is implemented by UE 101. In some embodiments, observation subsystem 205 is at least partially implemented by a processor that is remote from UE 101 (FIG. 1).

In some embodiments, observation subsystem 205 analyzes newly written computer readable code and checks the computer readable code against a preset ruleset. Observation subsystem 205 determines whether the computer readable code includes any violations and/or compliances with respect to the preset ruleset. Observation subsystem 205 causes the violations and/or compliances to be logged and stored on one or more of UE 101 or database 105 (FIG. 1). In some embodiments, the violations and/or compliances are stored locally on UE 101 and processed locally by analysis subsystem 207 or sent to database 105 to be processed by analysis subsystem 207 remotely. In some embodiments, the analysis subsystem 207 is configured to process the violations and/or compliances locally on UE 101 and optionally communicate the results of the analysis to a remote portion of management platform 203 or analysis subsystem 207 for processing and storage in database 105.

Observation subsystem 205 helps to assess a developer's knowledge and execution of knowledge in practice. For example, although developers sometimes lack security knowledge, developers more often than not are aware of many security vulnerabilities (i.e., have knowledge), but still fail to take known security vulnerabilities into account in practice.

In some embodiments, the computer readable code generated by a developer comprises one or more textual characters. The observation subsystem 205 is configured to cause at least one error in the code to be displayed differently by one or more differentiation modes. In some embodiments, the at least one error is indicative of a violation with respect to a ruleset, indicative of a security vulnerability that is conventionally recognizable, indicative of a security vulnerability that is proprietary within an organization or program, or indicative of some other definable mistake or issue in the code that the management platform 203 is configured to recognize should be corrected. In some embodiments, the one or more differentiation modes comprise one or more of highlighting the at least one error, underlining the at least one error, changing a font of the at least one error, changing a font size of the at least one error, displaying the at least one error in a bold font, displaying the at least one error in an italicized font, displaying the at least one error using a different color text compared to the portion of the computer readable code that is free from having the one or more errors, boxing-in the at least one error, circling the at least one error, or some other suitable indicator that is capable of drawing a user's attention to one portion of the computer readable code over another portion of the computer readable code. In some embodiments, underlining the at least one error comprises displaying at least one straight line below a portion of the computer readable code. In some embodiments, underlining the at least one error comprises displaying at least one squiggly line below a portion of the computer readable code. In some embodiments, underlining the at least one error comprises displaying a combination of at least one straight line and at least one squiggly line below a portion of the computer readable code. In some embodiments, underlining the at least one error comprises displaying some other suitable marking or identifier below a portion of the computer readable code.

In some embodiments, observation subsystem 205 is configured to cause some information indicative of a type of vulnerability associated with an identified error in the computer readable code to be displayed.

In some embodiments, observation subsystem 205 is configured to cause information indicative of the quantity of violations and compliances for each type of vulnerability to be stored in database 105. The analysis subsystem 207 is configured to process the quantity of violations and compliances for each type of vulnerability to calculate the practical skills of a developer regarding various vulnerabilities. In some embodiments, the analysis subsystem 207 is configured to monitor the amount of times a developer encounters a potential issue of each type. In some embodiments, the remediation subsystem 209 is configured to determine what skillset the developer should have to securely perform the developer's day-to-day tasks.

In some embodiments, practice observer module 213 and skills observer module 215 are implemented as a headless scan. In some embodiments, the observation subsystem 205 is configured to process previously written computer readable code to identify one or more errors or compliances in the computer readable code. In some embodiments, the headless scan is executed by one or more build servers or version control systems (VCS) on one or more of UE 101 or remotely from UE 101. In some embodiments, the headless scan is executed automatically. In some embodiments, the headless scan is run in accordance with a predefined schedule. In some embodiments, the headless scan is executed after every update to a code base. The headless scan makes it possible to generate an overview of the overall state of a product in development, including how many compliances and how many violations for each type of vulnerability are detected in computer readable code generated by one or more developers.

In some embodiments, the headless scan is limited to scanning already developed code as opposed to the real-time processing of code by the observation subsystem 205 as the code is being written by way of, for example, the IDE plugin. In some embodiments, the headless scan is configured to process code in the real-time as the code is being written.

In some embodiments, the version control system is configured to generate information identifying which developer produces which line of code. For every violation and compliance observation subsystem 205 determines which developer produced the compliant code and which developer produced code having at least one error. The observation subsystem 205 is configured to calculate each developer's security skills in practice in the recent past by way of the headless scan in combination with version control system, serving as the practice observer module 213.

In some embodiments, observation subsystem 205 is configured to identify each line of computer readable code produced by each developer associated with system 100 and categorize each developer based on what kind of security critical features the developer is usually working on such that the headless scan and version control system serve as the skills observer module 215.

In some embodiments, skills observer module is configured to generate one or more tables and/or graphs that includes an overview of headless scan results for a ruleset on a code base.

Analysis subsystem 207 is configured to process the data gathered by the knowledge observer module 211, the practice observer module 213, and the skills observer module 215. In some embodiments, one or more analyses performed by the analysis subsystem 207 is performed on UE 101 or on a computer remote from UE 101 that executes the analysis subsystem 207.

In some embodiments, if the IDE plugin is used to gather practice data, knowledge data and/or skills data, the analysis performed by analysis subsystem 207 is performed on UE 101. In some embodiments, data gathered by the headless scan and/or the training platform is optionally forwarded to the IDE plugin for processing by the analysis subsystem 207. Executing the analysis subsystem 207 on UE 101 makes it possible to protect sensitive data gathered by the analysis subsystem by preventing the gathered data from leaving UE 101 so that the gathered data is not leaked to an external entity.

In some embodiments, if the training platform implements the analysis subsystem 207, data collected by the IDE plugin and the headless scan is securely transferred to the management platform 203 executed remotely from UE 101 for processing.

The analysis subsystem 207 is configured to compare the skills that a developer should have for performing the developer's day-to-day tasks to the knowledge and skills that are detected by observation subsystem 205 and determine if there are any gaps.

As a non-limiting example, in a scenario in which developers A, B and C are developing an application for a company that implements system 100, analysis subsystem 207 is configured to direct developers A, B and C differently.

For example, if developer A is developing an application and, while writing his code, developer A makes several mistakes on XML injection. These mistakes are discovered by the practice observer module 213, either in real-time as he is writing the code with the IDE plugin, or after pushing the changes to the VCS with the headless scan. The analysis subsystem 207 compares these recent mistakes to developer A's knowledge, using the data from the knowledge observer module 211.

The analysis subsystem 207 determines that developer A has not had any training on XML injection. The analysis subsystem 207 then advises developer A to follow in-depth training regarding XML injection.

If developer B is developing an application and, while writing his code, developer B makes several mistakes on XML injection that are discovered by the practice observer module 213, either in real-time as he is writing the code with the IDE plugin, or after pushing the changes to the VCS with the headless scan. The analysis subsystem 207 compares these recent mistakes to developer B's knowledge, using the data from the knowledge observer module 211. The analysis subsystem 207, however, determines that developer B has had good accuracy on training for XML injection. But, developer B's last training session on XML injection was over 6 months ago. The analysis subsystem 207 then advises developer B to follow a refresher training sequence by way of the training platform.

If developer C is developing an application and, while writing his code, developer C makes several mistakes on XML injection that are discovered by the practice observer module 213, either in real-time as he is writing the code with the IDE plugin, or after pushing the changes to the VCS with the headless scan. The analysis subsystem 207 compares these recent mistakes to developer C's knowledge, using the data from the knowledge observer module 211. The analysis subsystem 207, however, determines that developer C has had good accuracy on training for XML injection. But, developer C's last training session on XML injection was less than a predefined threshold identified in management platform 203 as being very recent. The analysis subsystem 207 then advises developer C to not follow any additional training. Instead, management platform 203 provides practice remediation for developer C.

Remediation subsystem 209 comprises a knowledge remediation module 217 and a practice remediation module 219. Knowledge remediation module 217 is configured to provide a developer with additional training. Practice remediation module 219 is configured to provide a developer with a reminder of learned lessons applied to the developer's generated computer code.

In some embodiments, the training platform which was previously discussed as being implemented as the knowledge observer module 211 and the skills observer module 215, is also implemented as the analysis subsystem 207. In some embodiments, the training platform is configured to implement the knowledge remediation module 217 such that when the analysis subsystem 207 determines that a developer is in need of security training on a specific vulnerability, the knowledge remediation is provided to the developer by way of the training platform.

In some embodiments, management platform 203 is configured to support a wide range of languages, frameworks and vulnerabilities.

As a non-limiting example, in a scenario in which developers A and B are developing an application, wherein developers A and B are developing an Android application.

For example, developer A is writing the application using the Android framework in the Java programming language. The analysis subsystem 207 determines developer A has a lack of knowledge on Activity configurations in mobile applications and he requires in depth training. The next time developer A logs in to the training platform, developer A will be advised to complete a set of 5 training exercises, or training sequences, of increasing difficulty on the topic of Activity configurations. All code in the training challenges will be in Java and use the Android framework to make the training as relevant as possible.

Developer B is developing an Android application in Java, using the Android framework. The analysis subsystem 207 determines developer B does not have a lack of knowledge on Activity configurations, but requires a refresher. The next time developer B logs into the training platform, developer B will be advised to complete a set of one "medium" difficulty and one "hard" difficulty challenge regarding Activity configuration in Java, using the Android framework.

In some embodiments, the training platform is configured to provide challenges, on-demand from one or more of a user or the management platform 203, for improving a developer's skillset. In some embodiments, the training platform is configured to provide one or more challenges available among several challenges in the training platform, where each challenge has a predefined level of difficulty. In some embodiments, management platform 203 is configured to assign one or more challenges to be performed by a user based on the user's competence, skills, knowledge, basis for needing remediation, or some other suitable reason, and at least one of the assigned challenges is picked by the management platform 203 based, at least in part, on the predefined difficulty level of the challenge.

In some embodiments, one or more portions of management platform 203 are readily modifiable by a user, overseer, manager, or other suitable personnel or entity to customize the criteria the management platform 203 applies to identify and remediate errors in computer readable code, identify and remediate practice deficiencies, identify and remediate knowledge deficiencies, and/or identify and remediate skills deficiencies for individual users, teams, enterprise-wide, or at some other suitable scale.

In some embodiments, the knowledge observer module 211 gathers a user's performance in training, the practice observer module 213 gathers a user's performance in practice, the skills observer module 215 gathers a need for a user to have a particular skill, and the analysis subsystem 207 compares these statistics to determine if remediation is needed and what remediation should be performed.

In some embodiments, where one or more portions of management platform 203 are modifiable, management platform 203 makes it possible to adapt one or more subsystems, or modules thereof, to identify errors and/or provide remediation as needs change, new threats arise and/or new users are introduced to the system 100.

For example, if a void exists in a user's knowledge or understanding of certain concepts where there is data that is usable by the knowledge observer module 211 to indicate as such, the knowledge observer module 211 can detect it. In some embodiments, if the knowledge observer module 211 has no data regarding knowledge requirements or data indicative of a user's knowledge or capabilities, the user's knowledge and potential vulnerability is unknown to the company that implements system 100, so analysis subsystem 207 is configured to assume that the user does not have a certain knowledge level or has had limited training.

Based on this absence of data, the management platform 203 is configured to suggest a remediation that includes a training exercise or sequence for one or more users to perform. In some embodiments, the knowledge remediation based on an absence of knowledge data helps to establish a baseline for future analyses. In some embodiments, as new techniques develop, knowledge observer module 211 is capable of being updated to reflect changes in technology to help to ensure that users are educated to have at least the minimum knowledge base for performing tasks associated with their job function, day-to-day tasks, or goals.

In some embodiments, if a void exists in a user's knowledge or understanding of certain concepts where there is data that is usable by the knowledge observer module 211 to indicate as such, the knowledge observer module 211 can detect it, and where the practice observer module 213 has no data regarding knowledge requirements or practice deficiencies and, as such, cannot detect the knowledge deficiency based on practice observation or be readily able to provide data usable to initiate a remediation, the analysis subsystem 207 is configured to assume the user has a knowledge or skills deficiency based on the absence of practice data, and cause the remediation subsystem 209 to suggest one or more training exercises or sequences associated with the knowledge deficiency or skills deficiency based on the absence of data generated or capable of being gathered by the practice observer module 213. In some embodiments, the practice observer module 213 capable of being modified to recognize new techniques, changes in technology, or be adjusted based on new training exercises or sequences usable to observe a user's knowledge.

In some embodiments, if the knowledge observer module 211 has data regarding knowledge requirements or data indicative of a user's knowledge or capabilities, the user's knowledge and potential vulnerability is known to the company that implements system 100. In some embodiments, the practice observer module 213 is capable of being modified or updated to reflect changes in technique or technology that the practice observer module 213 is configured to observe. In some embodiments, modifying or updating the practice observer module 213 to reflect changes in technique or technology that the practice observer module 213 is configured to observe comprises modifying a pre-existing observation rule or creating a new observation rule. In some embodiments, the practice observer module 213 is capable of being modified or updated to reflect changes in technique or technology that coincide with changes or updates made to the knowledge observer module 211 to help to ensure that users are educated to have at least the minimum practical capabilities for performing tasks associated with their job function.

In some embodiments, analysis subsystem 207 is configured to detect an absence of data regarding a user's knowledge, practice capabilities or skills, and identify one or more deficits in the knowledge, practice capabilities and/or skillset the developer should have to perform the developer's day-to-day tasks, or with respect to a developer's goals based on the absence of data.

In some embodiments, remediation subsystem 209 is configured to suggest or add observation rules based on one or more identified deficits in the knowledge, practice capabilities and/or skillset the developer should have to perform the developer's day-to-day tasks, or with respect to a developer's goals based on the absence of data. In some embodiments, remediation subsystem 209 is capable of being modified to account for newly discovered knowledge deficiencies, newly discovered practice deficiencies, newly discovered skills deficiencies, alternative training methods, newly discovered system vulnerabilities, newly developed techniques, technologies or changes in a developer's day-to-day tasks or goals. In some embodiments, remediation subsystem 209 is configured to suggest modifications to the one or more of the knowledge observation module 211 or the practice observation module 213 such that a knowledge level, practice competency or skillset known to the remediation subsystem 209 is updated at the observation subsystem 205 level in the absence of data gathered by the observation subsystem 205.

Figure 3:
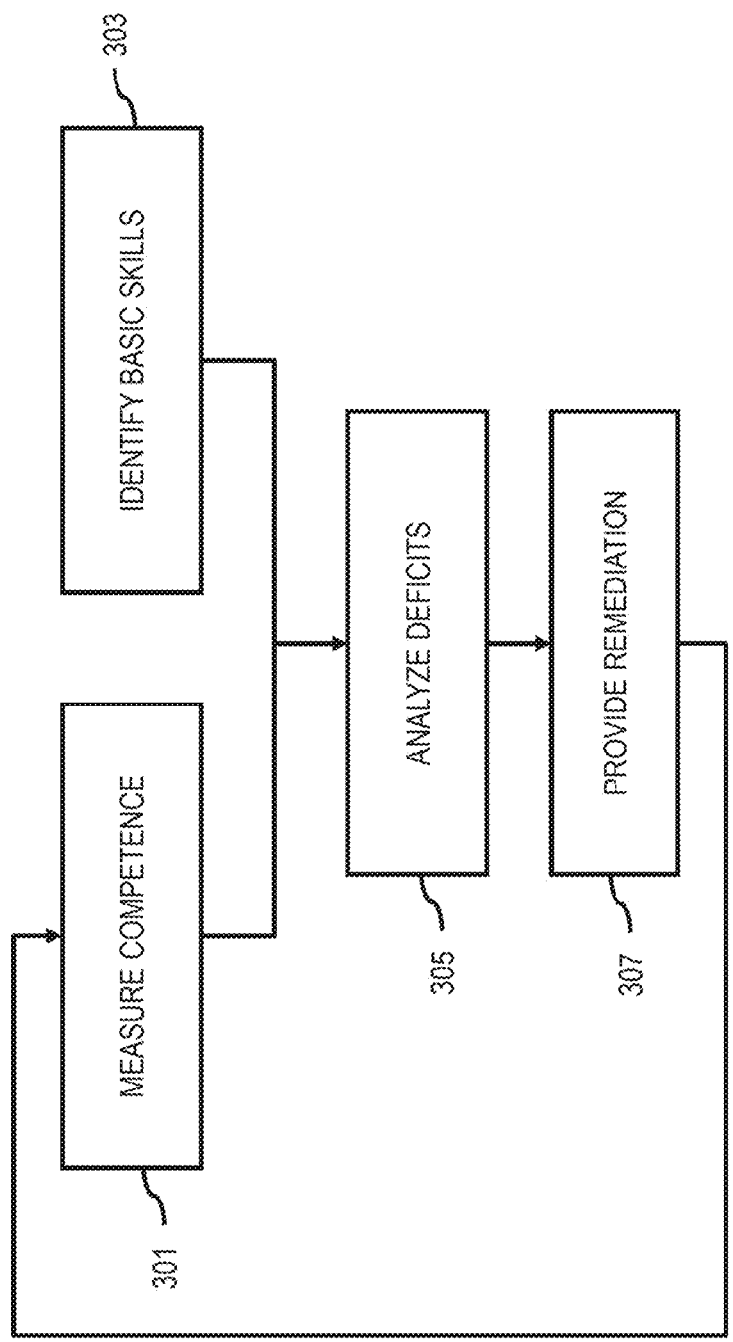
FIG. 3 is a flow chart of a method of providing adaptive security guidance, in accordance with one or more embodiments.

FIG. 3 is a flow chart of a method 300 of providing adaptive security guidance, in accordance with one or more embodiments. In some embodiments, method 300 is performed by at least one processor. In some embodiments, method 300 is performed by management platform 103 (FIG. 1).

In step 301, a competency of a user associated with a user profile stored in database 105 (FIG. 1) is determined.

In step 303, basic skills are identified for the user to perform his day-to-day tasks associated with an assigned job function or project that involves generating computer readable code.

In step 305, the user's competency is compared with the identified basic skills and any deficits with respect to the user's basic skills are identified and analyzed.

In step 307, remediation is provided to attempt to correct the identified deficits based on the analysis of the identified deficits.

Method 300 returns to step 301 to re-assess the user's competency and identify any deficits with respect to the user's basic skills. If the deficits continue to exist, remediation is again provided based on the analysis of the currently existing deficits and method 300 continues until the user's competency improves to a point that any identified deficits are within a predefined threshold indicating that the user's skills comply with the basis skills, non-existent indicating that the user's skills comply with the basic skills, no more remediation action is possible, the user's competency has improved to a level that shows a positive increase over time or a quantity of remediation cycles, or some other suitable basis for at least temporarily ending the remediation loop.

Figure 4:
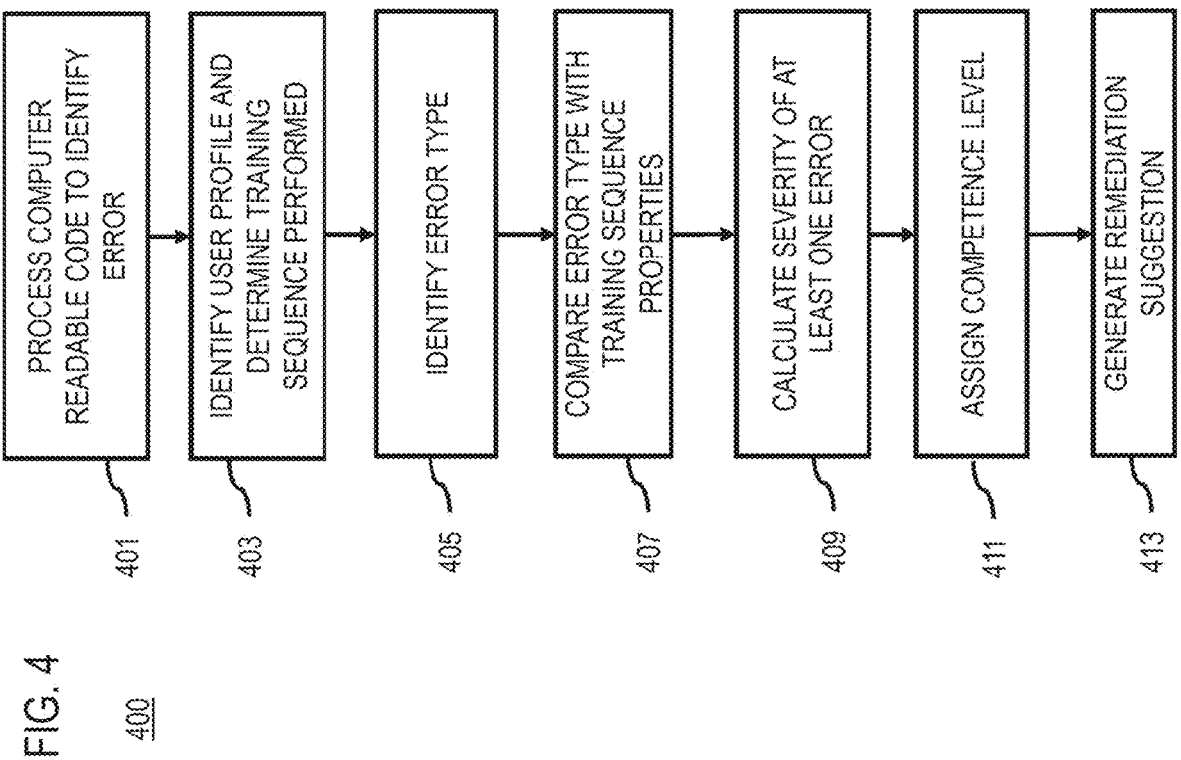
FIG. 4 is a flowchart of a method of providing adaptive security guidance, in accordance with one or more embodiments.

FIG. 4 is a flowchart of a method 400 of providing adaptive security guidance, in accordance with one or more embodiments. In some embodiments, method 400 is performed by management platform 103 (FIG. 1).

In step 401 computer readable code is processed to identify one or more errors in the computer readable code. In some embodiments, the computer readable code is output by a display, and at least one error of the one or more errors in the computer readable code is caused to be displayed differently compared to a portion of the computer readable code that is free from having the one or more errors.

In some embodiments, the computer readable code comprises one or more textual characters and the at least one error is caused to be displayed differently by one or more differentiation modes. In some embodiments, the one or more differentiation modes comprise one or more of highlighting the at least one error, underlining the at least one error, changing a font of the at least one error, changing a font size of the at least one error, displaying the at least one error in a bold font, displaying the at least one error in an italicized font, displaying the at least one error using a different color text compared to the portion of the computer readable code that is free from having the one or more errors, boxing-in the at least one error, circling the at least one error or some other suitable indicated that is capable of drawing a user's attention to one portion of the computer readable cover over another portion of the computer readable code. In some embodiments, underlining the at least one error comprises displaying at least one straight line below a portion of the computer readable code. In some embodiments, underlining the at least one error comprises displaying at least one squiggly line below a portion of the computer readable code. In some embodiments, underlining the at least one error comprises displaying a combination of at least one straight line and at least one squiggly line below a portion of the computer readable code. In some embodiments, underlining the at least one error comprises displaying some other suitable marking or identifier below a portion of the computer readable code.

In step 403, a user profile associated with one or more of a development environment, training platform, or other suitable code generation and/or observation system, used to generate the computer readable code is identified and a database having data associated with the user profile is searched for user profile information indicative of a training sequence performed by a user associated with the user profile.

In step 405, a type of at least one of the one or more errors identified in the computer readable code is identified. In some embodiments, the type of the at least one error is one of a plurality of different error types, and the one or more differentiation modes used to display the at least one error is based on the identified type of the at least one error. In some embodiments, the identification type of the at least one error is a security vulnerability. In some embodiments, the type of the security vulnerability is associated with a programming language, a portion of a software product, a step in a process for creating a software product, an identifiable bug in the computer readable code, or some other suitable identifier capable of being assigned to a vulnerability that could lead to a security breach in the computer readable code.

In step 407, the type of the at least one of the one or more errors identified in the computer readable code is compared with one or more properties associated with the training sequence.

In step 409, a severity of the at least one error is calculated based on the comparison with the one or more properties associated with the training sequence.

In step 411, a competence level is assigned to the user associated with the user profile based on the calculated severity.

In some embodiments, a total quantity of the one or more errors in the computer readable code is calculated, and the competence level assigned to the user associated with the user profile is further based on the total quantity of the one or more errors in the computer readable code.

In some embodiments, the total quantity of the one or more errors is stored in the database, and the type of each error of the quantity of the one or more errors is stored in the database. In some embodiments, the competence level assigned to the user associated with the user profile is further based on the type of each error stored in the database.

In some embodiments, the computer readable code generated by the user associated with the user profile is processed to determine a type of security critical feature the computer readable code one or more of includes or is directed, and the type of security critical feature is stored in the database. The database is searched for one or more instances of the type of security critical feature, and the type of the security feature that has a greatest quantity of instances in the database is identified. In some embodiments, the competence level is further based on the type of the security feature that has a greatest quantity of instances in the database.

In some embodiments, a quantity of tasks included in the training sequence is identified as being performed by the user associated with the user profile. A quantity of the tasks completed free from error is identified and compared with a quantity of the one or more errors. In some embodiments, the competence level assigned to the user associated with the user profile is further based on the comparison of the quantity of the one or more errors with the quantity of tasks completed free from error.

In some embodiments, one or more hints to complete one of more of the tasks included in the training sequence free from error are generated, and the competence level assigned to the user associated with the user profile is based on a quantity of hints applied by the user associated with the user profile to complete the one of more tasks included in the training sequence free from error.

In step 413, a remediation suggestion is generated to correct at least one of the one or more errors in the computer readable code based on the competence level.

In some embodiments, the remediation suggestion comprises at least one type of remediation. The at least one type of remediation comprises one or more of at least one hint to correct the at least one error, an instruction to repeat at least a portion of the training sequence comprising one or more tasks previously performed by the user associated with the user profile, a new training sequence generated for the user based on the competence level comprising one or more new tasks to teach the user associated with the user profile a skill associated with generating the computer readable code, or some other suitable instruction that aids the user in an attempt to correct the at least one error. In some embodiments, the at least one type of remediation suggestion is based on determination that a time difference between a last time the user associated with the user profile completed the training sequence and a time the computer readable code was generated is greater than a predetermined threshold value.

Figure 5:
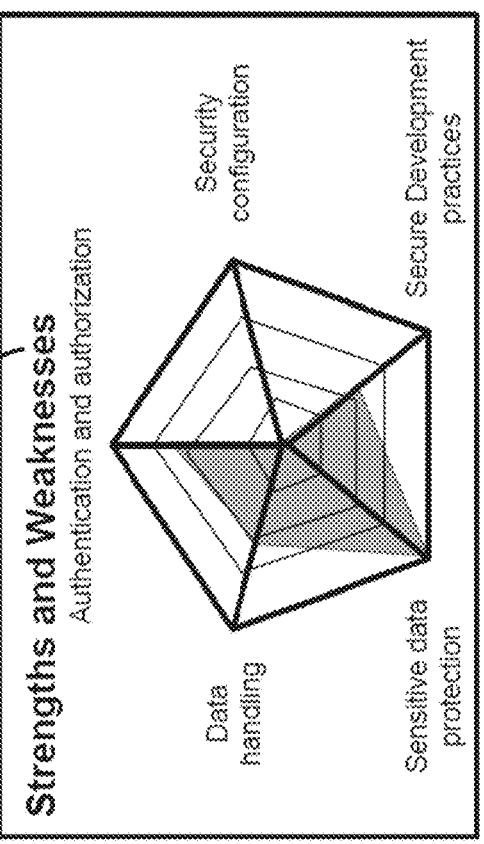
FIG. 5 is a diagram of a user interface, in accordance with one or more embodiments.
Figure 5:
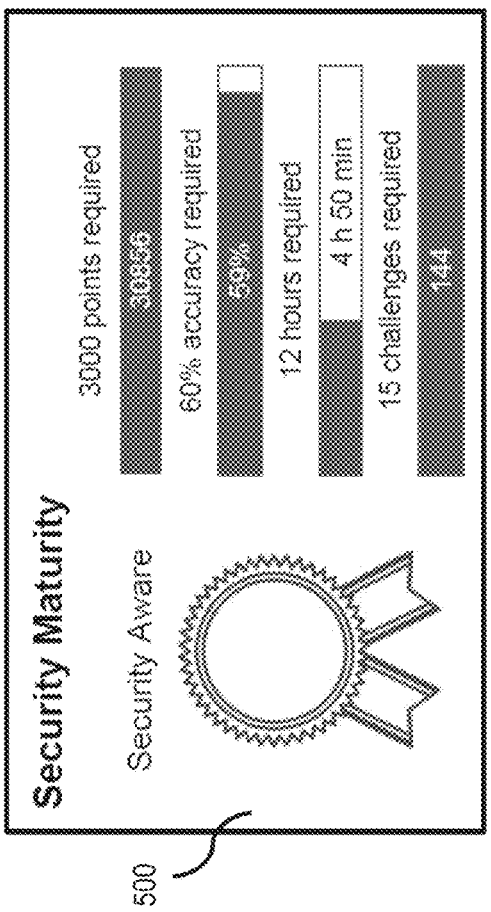
Figure 5:
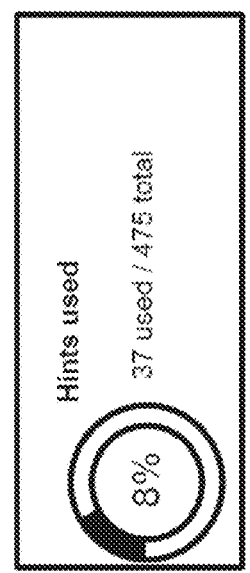
Figure 5:
Figure 5:
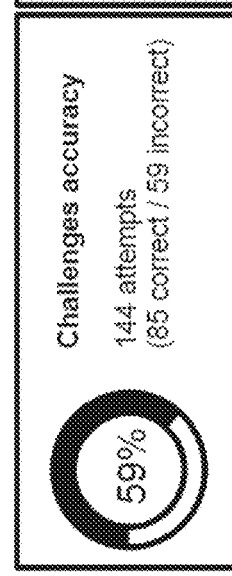
Figure 5:
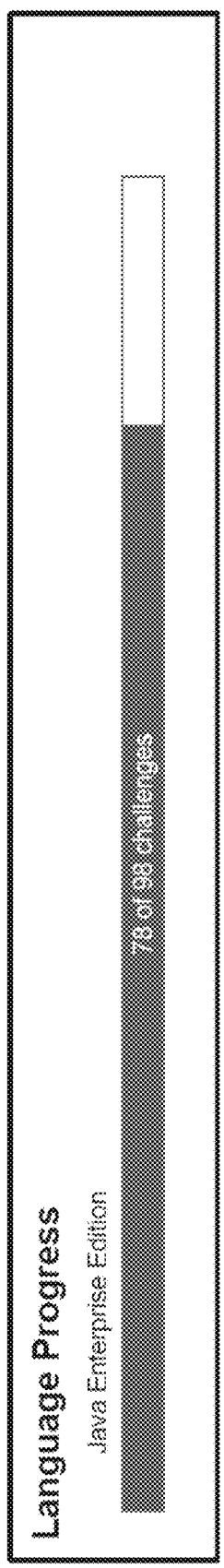

FIG. 5 is a diagram of a user interface 500, in accordance with one or more embodiments. User interface 500 is viewable by way of display 111 (FIG. 1). User interface 500 is configured to display summarized results associated regarding a developer's competency, or a group of developer's competency, based on information stored in a database having user profile information, such as database 105 (FIG. 1). In some embodiments, a developer's capabilities are displayed by way of a spider diagram 501 included in user interface 500.

As a non-limiting example, user interface 500 as shown in FIG. 5 provides information about a developer A that works for a company C. In this example, user interface 500 indicates that developer A has followed training on the system 100 (FIG. 1) for 4 hours and 50 minutes. User interface 500 indicates that, in this time, developer A has completed 144 challenges with an accuracy of 59%, and that developer A used a total of 37 hints to complete the 144 challenges. User interface 500 indicates that developer A has had very good results on challenges that revolve around sensitive data protection. User interface 500 also indicates that developer A also had average results on data handling, authentication and access control, and secure development practices. User interface 500, however, indicates that developer A has had very poor results for challenges regarding security configurations.

Management platform 103 (FIG. 1) is configured to allow a team manager at company C, for example, to impose minimum security skills to their developers. In this example of user interface 500, company C has imposed a training sequence on developer A, wherein developer A is directed to earn at least 3000 points and maintain 60% accuracy in an embodiment in which the management platform 103 tracks developer A's progress based on a points-based system. User interface 500 indicates that developer A has to spend at least 12 hours on training and complete 15 challenges in that time to earn the requisite points for completing the training sequence. In some embodiments, management platform 103 tracks a developer's progress using some other suitable method.

FIG. 6A is a diagram of a user interface 600, in accordance with one or more embodiments. User interface 600 is viewable by way of display 111 (FIG. 1). User interface 600 is an example output generated by management platform 103 (FIG. 1) based on the practice observer module 213 (FIG. 2) and the skills observer module 215 (FIG. 2).

User interface 600 indicates a portion of the computer readable code generated by a developer that has at least one error. In this example of user interface 600, the at least one error is identified by way of a squiggly underline and a balloon that indicates a type of the at least one error, or a type of flaw to which the at least one error could lead. In some embodiments, user interface 600 is an output generated by management platform 103 as the management platform 103 reviews computer readable code in real-time and differentiates erroneous computer readable code from non-erroneous computer readable code as a developer generates the computer readable code in the development environment.

In some embodiments, user interface 600 is associated with a plugin that is installed locally on UE 101 (FIG. 1). In some embodiments, user interface 600 is generated, or at least is caused to output information that differentiates the erroneous computer readable code based on a processing by management platform 103 that is one or more of performed locally on UE 101 or remotely from UE 101.

FIG. 6B is a diagram of a user interface 601, in accordance with one or more embodiments. User interface 601 is viewable by way of display 111 (FIG. 1). User interface 601 is an example output generated by management platform 103 (FIG. 1) based on the practice observer module 213 (FIG. 2) and the skills observer module 215 (FIG. 2).

User interface 601 indicates usage statistics corresponding to a quantity of violations and compliances for each type of vulnerability that may potentially exist within the computer readable code. The quantity of violations and compliances for each type of vulnerability is capable of being gathered by management platform 103 and processed by management platform 103 to one or more of detect the practical skills of a developer regarding various vulnerabilities or monitor the amount of times he encounters a potential issue of each type. In some embodiments, management platform 103 is configured to process the practical skills of a developer regarding various vulnerabilities that are detected and/or the amount of times the developer encounters a potential issue of each type information to identify the basic skills that a developer should have to securely perform his day-to-day tasks.

As a non-limiting example, user interfaces 600 and 601 shown in FIGS. 6A and 6B provide information regarding a developer A that writes a database query and concatenates the variables instead of using prepared statements. This is a practice that can lead to SQL injection. SQL Injection is an injection flaw, which is the first category of the OWASP top 10 categories, the most common vulnerabilities in web applications. In this example, the company C wants to prevent the introduction of the most common vulnerabilities, so company C has provided a ruleset to be implemented by management platform 103, either locally on UE 101 or remotely from UE 101, for the OWASP top 10.

In this example of user interfaces 600 and 601, the insecure code on developer A's screen is marked as insecure in user interface 600 and the violation is logged by management platform 103. Of the 10 database queries that developer A has produced using system 100, 5 have been insecure. So, developer A has 50% accuracy in practice for SQL injection. Based on information stored in database 105, management platform 103 is configured to identify that developer A has only written code that parses XML files once and has done this insecurely, so he has 0% accuracy for XML injection. But, on average, developer A requires SQL injection skills 10 times more often than XML injection.

Figure 7:
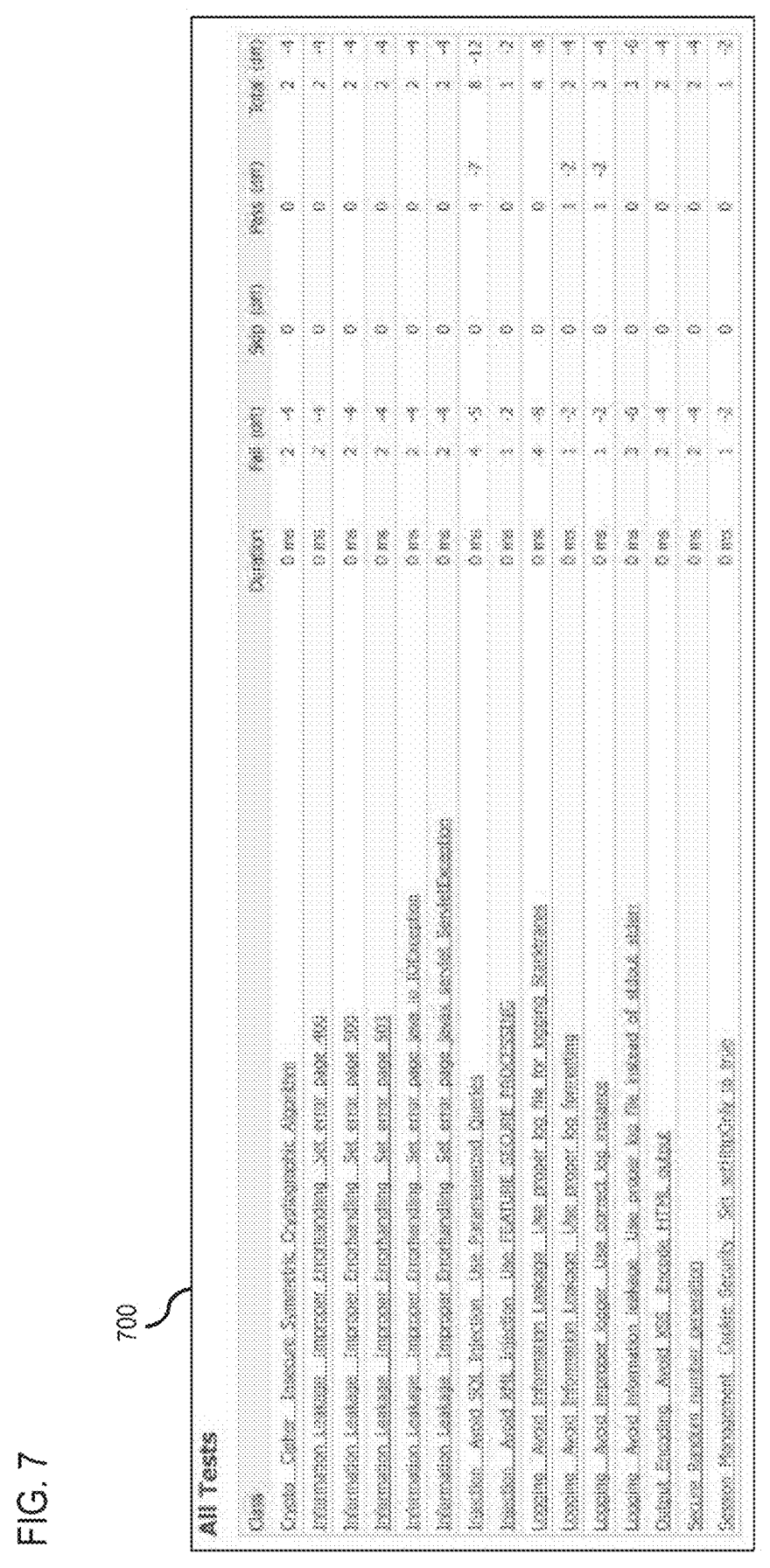

FIG. 7 is a diagram of a user interface 700, in accordance with one or more embodiments. User interface 700 is viewable by way of display 111 (FIG. 1). User interface 700 is an example output generated by management platform 103 (FIG. 1) based on the practice observer module 213 (FIG. 2) and the skills observer module 215 (FIG. 2).

User interface 700 is an overview of results generated based on the headless scan of the test results for a rule set on a code base. In some embodiments, user interface 700 comprises one or more of tables or graphs.

As a non-limiting example, user interface 700 shown in FIG. 7 provides information about a project P. Project P has two violations of an example rule "Crypto: Cipher: Insecure symmetric cryptographic algorithm" and no compliances, which means there is 0% accuracy. Project P also has 4 violations and 4 compliances to another example rule "Injection: Avoid SQL injection: Use parameterized queries", resulting in 50% accuracy.

User interface 700, in this example, indicates what kind of security skills are lacking in practice on a project/team level, and what kind of skills are needed. In the example, on average the team requires security expertise on SQL injection 4 times more than for symmetric encryption, but the team's skills are on average better developed for SQL injection.

Figure 8:
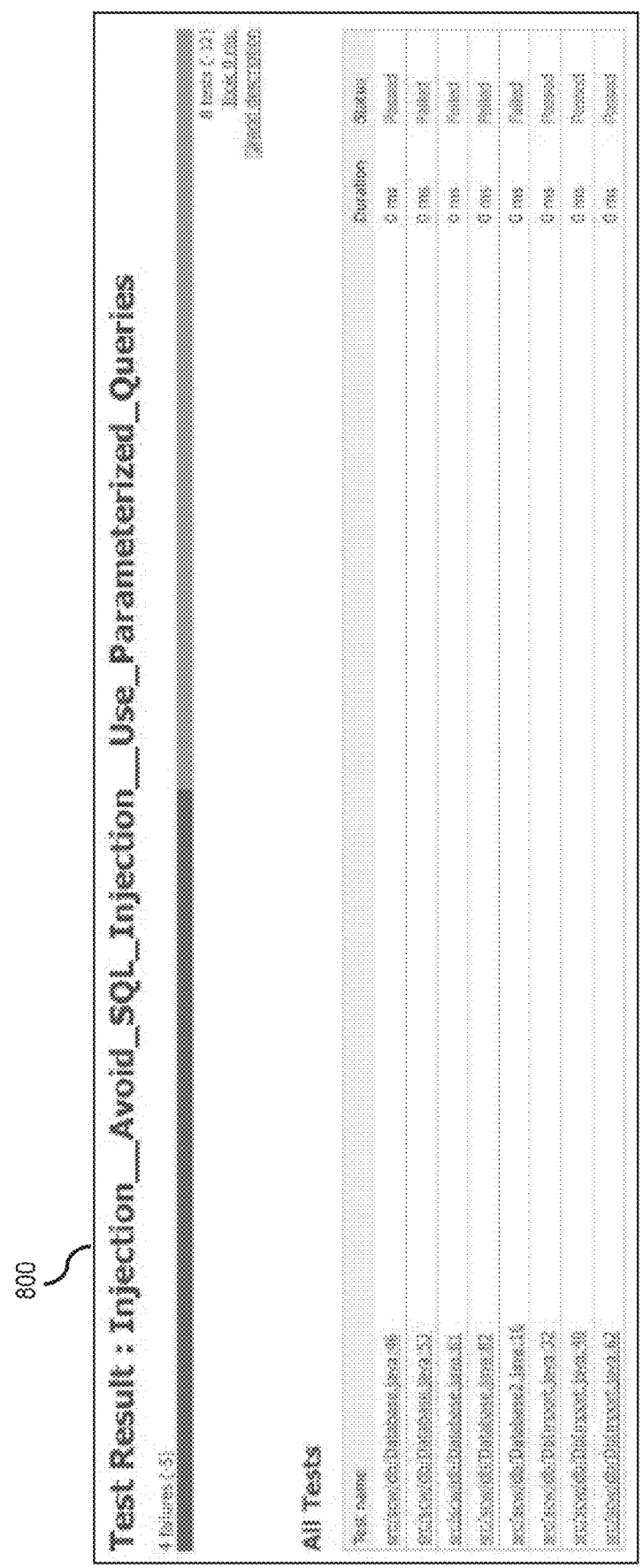
FIG. 8 is a diagram of a user interface, in accordance with one or more embodiments.

FIG. 8 is a diagram of a user interface 800, in accordance with one or more embodiments. User interface 800 is viewable by way of display 111 (FIG. 1). User interface 800 is an example output generated by management platform 103 (FIG. 1) based on the practice observer module 213 (FIG. 2) and the skills observer module 215 (FIG. 2).

User interface 800 is configured to provide granular results of one rule applied on the code base, and shows each individual compliance and violation instance, as well as where in the code base each individual compliance and violation is situated.

As a non-limiting example, user interface 800 shown in FIG. 8 provides information indicating that out of the four violations for SQL injection, three are in the Database.java file and one is in the Database2.java file. DBImport has 0 violations. In some embodiments, user interface 800 is configured to indicate which developer generated which portion of computer readable code included in a project. For example, user interface 800 is optionally configured to one or more of indicate that the author of the Database.java and Database2.java file is developer A and that developer A has an accuracy of 20% for SQL injection, and has needed expertise on the topic a total of five times, or indicate that a developer B is the author of DbImport.java and that developer B has an accuracy of 100% on three occurrences.

Figure 9:
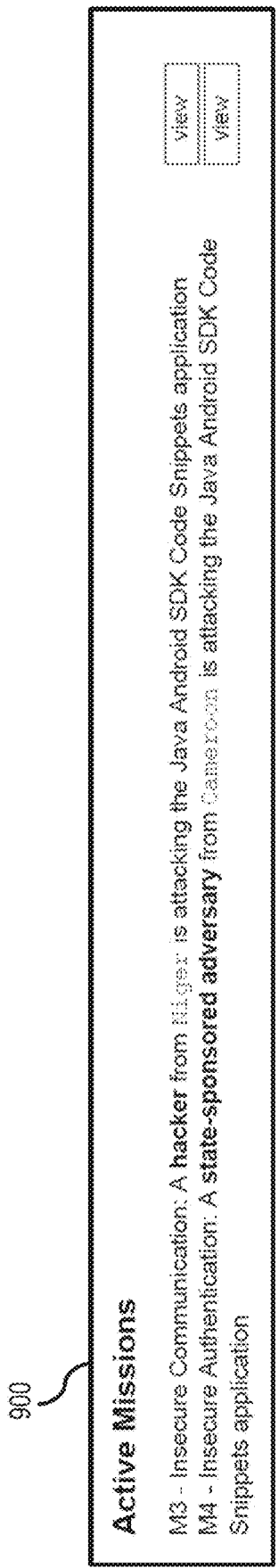
FIG. 9 is a diagram of a user interface, in accordance with one or more embodiments.

FIG. 9 is a diagram of a user interface 900, in accordance with one or more embodiments. User interface 900 is viewable by way of display 111 (FIG. 1). User interface 900 is an example output generated by management platform 103 (FIG. 1) based on the remediation subsystem 209.

User interface 900 is configured to provide individual learning paths that advise a user to perform one or more challenges that are presented as active missions intended to help a user improve the user's knowledge and/or practice skills.

FIG. 10 is a diagram of a user interface 1000, in accordance with one or more embodiments. User interface 1000 is viewable by way of display 111 (FIG. 1). User interface 1000 is an example output generated by management platform 103 (FIG. 1) based on the remediation subsystem 209.

In some embodiments, management platform 103 not only detects and logs the one or more errors and compliances in computer readable code generated by a user but is also configured to suggest possible fixes when code is determined to include one or more errors. In some embodiments, user interface 1000 is configured to display one or more QuickFixes that are helpful for a developer that management platform 103 recognizes has sufficient knowledge but cannot identify erroneous computer readable code in practice.

In some embodiments, user interface 1000 is configured to counter a gap that often occurs between a developer's knowledge and practice skills in generating computer readable code by helping developers to better apply the developer's knowledge during code generation and/or training. In some embodiments, user interface 1000 is configured to provide QuickFixes for systems associated with one or more of VisualStudio, IntelliJ, AndroidStudio, Eclipse, or other suitable code generation environment.

Figure 11:
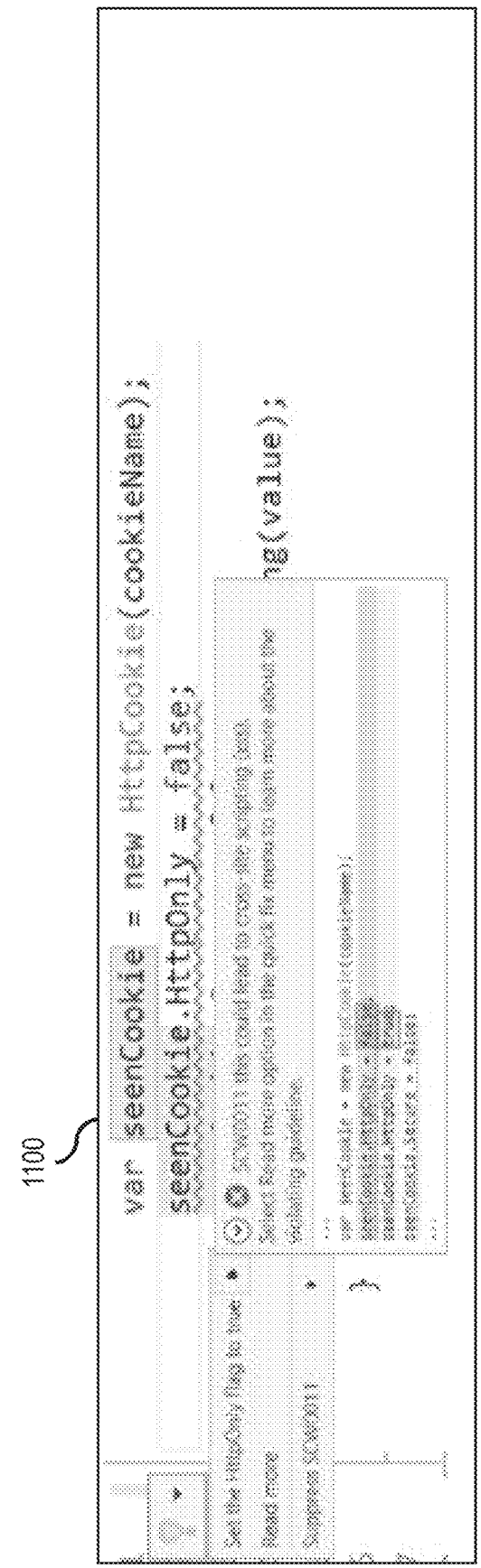
FIG. 11 is a diagram of a user interface, in accordance with one or more embodiments.

FIG. 11 is a diagram of a user interface 1100, in accordance with one or more embodiments. User interface 1100 is viewable by way of display 111 (FIG. 1). User interface 1100 is an example output generated by management platform 103 (FIG. 1) based on the remediation subsystem 209.

In some embodiments, management platform 103 not only detects and logs the one or more errors and compliances in computer readable code generated by a user but is also configured to suggest possible fixes when code is determined to include one or more errors. In some embodiments, user interface 1100 is configured to display one or more QuickFixes that are helpful for a developer that management platform 103 recognizes has sufficient knowledge but cannot identify erroneous computer readable code in practice.

In some embodiments, user interface 1100 is configured to counter a gap that often occurs between a developer's knowledge and practice skills in generating computer readable code by helping developers to better apply the developer's knowledge during code generation and/or training. In some embodiments, user interface 1100 is configured to provide QuickFixes for systems associated with one or more of VisualStudio, IntelliJ, AndroidStudio, Eclipse, or other suitable code generation environment.

Figure 12:
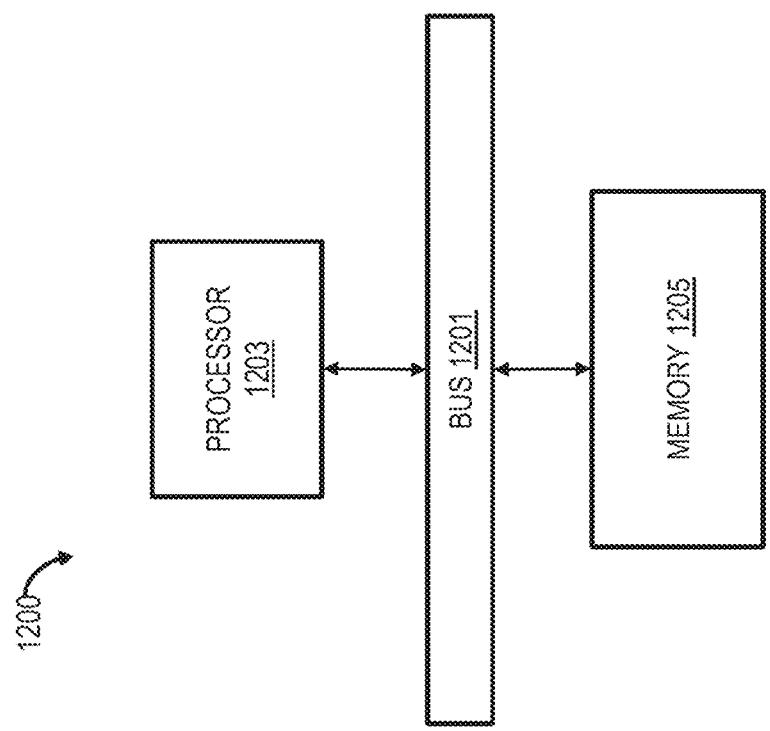
FIG. 12 is a functional block diagram of a computer or processor-based system upon which or by which some embodiments are implemented.

FIG. 12 is a functional block diagram of a computer or processor-based system 1200 upon which or by which an embodiment is implemented.

Processor-based system 1200 is programmed to provide adaptive security guidance, as described herein, and includes, for example, bus 1201, processor 1203, and memory 1205 components.

In some embodiments, the processor-based system is implemented as a single "system on a chip." Processor-based system 1200, or a portion thereof, constitutes a mechanism for performing one or more steps of providing adaptive security guidance.

In some embodiments, the processor-based system 1200 includes a communication mechanism such as bus 1201 for transferring information and/or instructions among the components of the processor-based system 1200. Processor 1203 is connected to the bus 1201 to obtain instructions for execution and process information stored in, for example, the memory 1205. In some embodiments, the processor 1203 is also accompanied with one or more specialized components to perform certain processing functions and tasks such as one or more digital signal processors (DSP), or one or more application-specific integrated circuits (ASIC). A DSP typically is configured to process real-world signals (e.g., sound) in real time independently of the processor 1203. Similarly, an ASIC is configurable to perform specialized functions not easily performed by a more general purpose processor. Other specialized components to aid in performing the functions described herein optionally include one or more field programmable gate arrays (FPGA), one or more controllers, or one or more other special-purpose computer chips.

In one or more embodiments, the processor (or multiple processors) 1203 performs a set of operations on information as specified by a set of instructions stored in memory 1205 related to provide adaptive security guidance. The execution of the instructions causes the processor to perform specified functions.

The processor 1203 and accompanying components are connected to the memory 1205 via the bus 1201. The memory 1205 includes one or more of dynamic memory (e.g., RAM, magnetic disk, writable optical disk, etc.) and static memory (e.g., ROM, CD-ROM, etc.) for storing executable instructions that when executed perform the steps described herein to provide adaptive security guidance. The memory 1205 also stores the data associated with or generated by the execution of the steps.

In one or more embodiments, the memory 1205, such as a random access memory (RAM) or any other dynamic storage device, stores information including processor instructions for providing adaptive security guidance. Dynamic memory allows information stored therein to be changed by system 100. RAM allows a unit of information stored at a location called a memory address to be stored and retrieved independently of information at neighboring addresses. The memory 1205 is also used by the processor 1203 to store temporary values during execution of processor instructions. In various embodiments, the memory 1205 is a read only memory (ROM) or any other static storage device coupled to the bus 1201 for storing static information, including instructions, that is not changed by the system 100. Some memory is composed of volatile storage that loses the information stored thereon when power is lost. In some embodiments, the memory 1205 is a non-volatile (persistent) storage device, such as a magnetic disk, optical disk or flash card, for storing information, including instructions, that persists even when the system 100 is turned off or otherwise loses power.

The term "computer-readable medium" as used herein refers to any medium that participates in providing information to processor 1203, including instructions for execution. Such a medium takes many forms, including, but not limited to computer-readable storage medium (e.g., non-volatile media, volatile media). Non-volatile media includes, for example, optical or magnetic disks. Volatile media include, for example, dynamic memory. Common forms of computer-readable media include, for example, a floppy disk, a flexible disk, a hard disk, a magnetic tape, another magnetic medium, a CD-ROM, CDRW, DVD, another optical medium, punch cards, paper tape, optical mark sheets, another physical medium with patterns of holes or other optically recognizable indicia, a RAM, a PROM, an EPROM, a FLASH-EPROM, an EEPROM, a flash memory, another memory chip or cartridge, or another medium from which a computer can read. The term computer-readable storage medium is used herein to refer to a computer-readable medium.

An aspect of this description relates to a method that comprises processing, by a processor, computer readable code as the computer readable code is being written in a development environment to identify at least one error in the computer readable code. The method also comprises searching a database for user profile information indicative of a training sequence performed by a user and a competence level assigned to the user. The competence level is based on a quantity of tasks included in the training sequence performed by the user free from error. The method also comprises causing a graphical user interface to be displayed. The graphical user interface comprises a concurrent display of the computer readable code having the at least one error, a preview of the computer readable code free from having the at least one error, and a remediation suggestion to correct the at least one error in the computer readable code based on the competence level. The remediation suggestion comprises a selectable link to correct the computer readable code having the at least one error in accordance with the preview of the computer readable code free from having the at least error.

Another aspect of this description relates to an apparatus comprising at least one processor and at least one non-transitory computer readable storage medium comprising computer readable instructions that, when executed by the at least one processor, cause the apparatus to process computer readable code as the computer readable code is being written in a development environment to identify at least one error in the computer readable code. The apparatus is also caused to search a database for user profile information indicative of a training sequence performed by a user and a competence level assigned to the user. The competence level is based on a quantity of tasks included in the training sequence performed by the user free from error. The apparatus is further caused to cause a graphical user interface to be displayed. The graphical user interface comprises a concurrent display of the computer readable code having the at least one error, a preview of the computer readable code free from having the at least one error, and a remediation suggestion to correct the at least one error in the computer readable code based on the competence level. The remediation suggestion comprises a selectable link to correct the computer readable code having the at least one error in accordance with the preview of the computer readable code free from having the at least error.

Another aspect of this description relates to a non-transitory computer readable medium comprising computer readable instructions that, when executed by a processor, cause the apparatus to process computer readable code as the computer readable code is being written in a development environment to identify at least one error in the computer readable code. The apparatus is also caused to search a database for user profile information indicative of a training sequence performed by a user and a competence level assigned to the user. The competence level is based on a quantity of tasks included in the training sequence performed by the user free from error. The apparatus is further caused to cause a graphical user interface to be displayed. The graphical user interface comprises a concurrent display of the computer readable code having the at least one error, a preview of the computer readable code free from having the at least one error, and a remediation suggestion to correct the at least one error in the computer readable code based on the competence level. The remediation suggestion comprises a selectable link to correct the computer readable code having the at least one error in accordance with the preview of the computer readable code free from having the at least error.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:
    processing, by a processor, computer readable code as the computer readable code is being written in a development environment to identify at least one error in the computer readable code;
    searching a database for user profile information indicative of a training sequence performed by a user and a competence level assigned to the user, wherein the competence level is based on a total quantity of errors in the computer readable code and a quantity of tasks included in the training sequence performed by the user free from error, and the tasks included in the training sequence comprise a set of a plurality of separate coding challenges;
    determining a time difference between a last time the user completed the training sequence and a time the computer readable code was written; generating a remediation suggestion to correct the at least one error in the computer readable code based on a comparison of the total quantity of errors in the computer readable code to the quantity of tasks included in the training sequence free from error, the competence level, and the time difference between the last time the user completed the training sequence and the time the computer readable code was written; and
    causing a graphical user interface to be displayed, the graphical user interface comprising a concurrent display of:
    the computer readable code having the at least one error;
    a preview of the computer readable code, wherein the preview of the computer readable code is free from having the at least one error; and
    the remediation suggestion,
    wherein in response to determining the time difference between the last time the user completed the training sequence and the time the computer readable code was written is greater than a predetermined threshold value, the remediation suggestion is caused to comprise:
        a selectable link to correct the computer readable code having the at least one error in accordance with the preview of the computer readable code free from having the at least one error; and
        an instruction to repeat at least a portion of the training sequence comprising one or more tasks previously performed by the user, and
    in response to determining the time difference between the last time the user completed the training sequence and the time the computer readable code was written is less than the predetermined threshold value, the remediation suggestion is caused to comprise:
        the selectable link to correct the computer readable code having the at least one error in accordance with the preview of the computer readable code free from having the at least one error; and
        an indication that the user need not follow an additional training sequence.

2. The method of claim 1, further comprising:
    causing the at least one error in the computer readable code to be displayed differently in the development environment compared to a portion of the computer readable code that is free from having the at least one error in real-time as the code is being written in the development environment.

3. The method of claim 2, wherein the computer readable code comprises one or more textual characters and the at least one error is caused to be displayed differently by one or more differentiation modes, the one or more differentiation modes comprising one or more of highlighting the at least one error, underlining the at least one error, changing a font of the at least one error, changing a font size of the at least one error, displaying the at least one error in a bold font, displaying the at least one error in an italicized font, or displaying the at least one error using a different color text compared to the portion of the computer readable code that is free from having the at least one error.

4. The method of claim 1, wherein the at least one error is associated with a type of security vulnerability in the computer readable code.

5. The method of claim 1, wherein the remediation suggestion further comprises a new training sequence generated for the user based on the competence level comprising one or more new tasks to teach the user a skill associated with writing the computer readable code.

6. An apparatus, comprising:
    at least one processor; and
    at least one non-transitory computer readable storage medium comprising computer readable instructions that, when executed by the at least one processor, cause the apparatus to:
    process computer readable code as the computer readable code is being written in a development environment to identify at least one error in the computer readable code;
    search a database for user profile information indicative of a training sequence performed by a user and a competence level assigned to the user, wherein the competence level is based on a total quantity of errors in the computer readable code and a quantity of tasks included in the training sequence performed by the user free from error, and the tasks included in the training sequence comprise a set of a plurality of separate coding challenges;

determine a time difference between a last time the user completed the training sequence and a time the computer readable code was written;

generate a remediation suggestion to correct the at least one error in the computer readable code based on a comparison of the total quantity of errors in the computer readable code to the quantity of tasks included in the training sequence free from error, the competence level, and the time difference between the last time the user completed the training sequence and the time the computer readable code was written; and cause a graphical user interface to be displayed, the graphical user interface comprising a concurrent display of:

the computer readable code having the at least one error;

a preview of the computer readable code, wherein the preview of the computer readable code is free from having the at least one error; and the remediation suggestion, wherein in response to determining the time difference between the last time the user completed the training sequence and the time the computer readable code was written is greater than a predetermined threshold value, the remediation suggestion is caused to comprise:

a selectable link to correct the computer readable code having the at least one error in accordance with the preview of the computer readable code free from having the at least one error; and an instruction to repeat at least a portion of the training sequence comprising one or more tasks previously performed by the user, and in response to determining the time difference between the last time the user completed the training sequence and the time the computer readable code was written is less than the predetermined threshold value, the remediation suggestion is caused to comprise:

the selectable link to correct the computer readable code having the at least one error in accordance with the preview of the computer readable code free from having the at least one error; and an indication that the user need not follow an additional training sequence.

7. The apparatus of claim 6, wherein the apparatus is further caused to:

cause the at least one error in the computer readable code to be displayed differently in the development environment compared to a portion of the computer readable code that is free from having the at least one error in real-time as the code is being written in the development environment.

8. The apparatus of claim 7, wherein the computer readable code comprises one or more textual characters and the at least one error is caused to be displayed differently by one or more differentiation modes, the one or more differentiation modes comprising one or more of highlighting the at least one error, underlining the at least one error, changing a font of the at least one error, changing a font size of the at least one error, displaying the at least one error in a bold font, displaying the at least one error in an italicized font, or displaying the at least one error using a different color text compared to the portion of the computer readable code that is free from having the at least one error.

9. The apparatus of claim 6, wherein the at least one error is associated with a type of security vulnerability in the computer readable code.

10. The apparatus of claim 6, wherein the remediation suggestion further comprises a new training sequence generated for the user based on the competence level comprising one or more new tasks to teach the user a skill associated with writing the computer readable code.

11. A non-transitory computer readable medium having instructions stored thereon that, when executed by a processor, cause an apparatus to:

process computer readable code as the computer readable code is being written in a development environment to identify at least one error in the computer readable code;

search a database for user profile information indicative of a training sequence performed by a user and a competence level assigned to the user, wherein the competence level is based on a total quantity of errors in the computer readable code and a quantity of tasks included in the training sequence performed by the user free from error, and the tasks included in the training sequence comprise a set of a plurality of separate coding challenges;

determine a time difference between a last time the user completed the training sequence and a time the computer readable code was written;

generate a remediation suggestion to correct the at least one error in the computer readable code based on a comparison of the total quantity of errors in the computer readable code to the quantity of tasks included in the training sequence free from error, the competence level, and the time difference between the last time the user completed the training sequence and the time the computer readable code was written; and cause a graphical user interface to be displayed, the graphical user interface comprising a concurrent display of:

the computer readable code having the at least one error;

a preview of the computer readable code, wherein the preview of the computer readable code is free from having the at least one error; and the remediation suggestion, wherein in response to determining the time difference between the last time the user completed the training sequence and the time the computer readable code was written is greater than a predetermined threshold value, the remediation suggestion is caused to comprise:

a selectable link to correct the computer readable code having the at least one error in accordance with the preview of the computer readable code free from having the at least one error; and an instruction to repeat at least a portion of the training sequence comprising one or more tasks previously performed by the user, and in response to determining the time difference between the last time the user completed the training sequence and the time the computer readable code was written is less than the predetermined threshold value, the remediation suggestion is caused to comprise:

the selectable link to correct the computer readable code having the at least one error in accordance with the preview of the computer readable code free from having the at least one error; and an indication that the user need not follow an additional training sequence.

12. The non-transitory computer readable medium of claim 11, wherein the apparatus is further caused to:
cause the at least one error in the computer readable code to be displayed differently in the development environment compared to a portion of the computer readable code that is free from having the at least one error in real-time as the code is being written in the development environment.

13. The non-transitory computer readable medium of claim 12, wherein the computer readable code comprises one or more textual characters and the at least one error is caused to be displayed differently by one or more differentiation modes, the one or more differentiation modes comprising one or more of highlighting the at least one error, underlining the at least one error, changing a font of the at least one error, changing a font size of the at least one error, displaying the at least one error in a bold font, displaying the at least one error in an italicized font, or displaying the at least one error using a different color text compared to the portion of the computer readable code that is free from having the at least one error.

14. The non-transitory computer readable medium of claim 11, wherein the at least one error is associated with a type of security vulnerability in the computer readable code.

\* \* \* \* \*